March 28, 1950 G. A. TINNERMAN 2,501,701
SELF-CLINCHING FASTENING DEVICE
Filed April 20, 1945
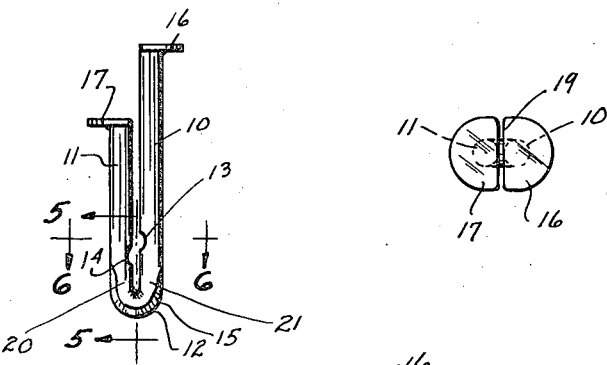
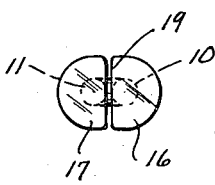
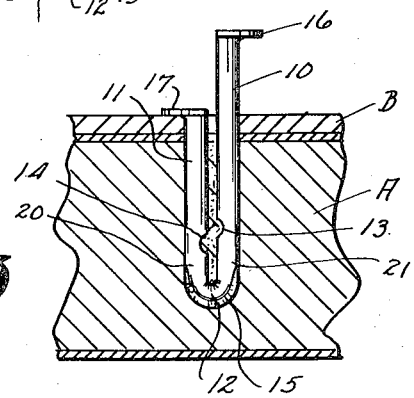
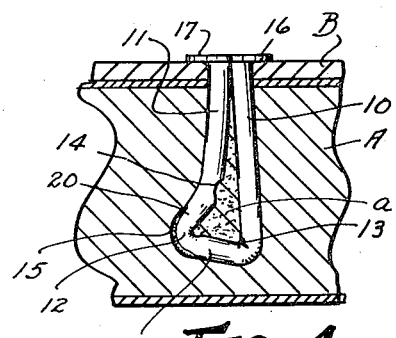
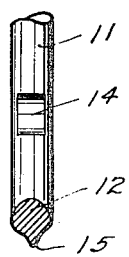
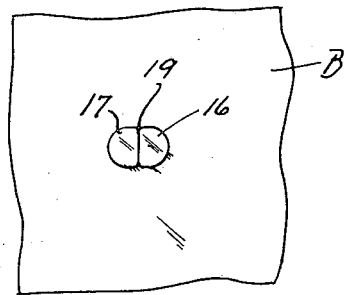
INVENTOR.
GEORGE A. TINNERMAN
BY
Bates, Teare, & McBean
ATTORNEYS Patented Mar. 28, 1950

2,501,701

UNITED STATES PATENT OFFICE 2,501,701

SELF-CLINCHING FASTENING DEVICE

George A. Tinnerman, Cleveland, Ohio, assignor to Tinnerman Products, Inc., Cleveland, Ohio, a corporation of Ohio Application April 20, 1945, Serial No. 589,356

4 Claims. (Cl. 85—23)

This invention relates to a fastening device especially adapted for securing a layer of material on a support of such character that it will not effectively retain an ordinary nail or screw. To that end I have provided a self-clinching nail adapted to be driven through the layer to be attached into the support and so formed that it will automatically spread itself within the support, whereby it becomes firmly locked thereto.

My invention is in the nature of an improvement on the self-clinching nail shown in Patent No. 2,355,955, granted August 15, 1944, to H. G. Cummings. Like that patent my nail has two legs of unequal length connected together at the bottom, the legs being notched to weaken them in certain regions adjacent the bottom and the shorter leg having a head adapted to engage the outer surface of the layer to be attached to anchor that leg, the subsequent deformation of the leg being effected by thereafter driving in the longer leg.

My invention, however, differs from the self-clinching nail shown in the Cummings patent in several important particulars resulting in increased advantages, which it is the object of this invention to obtain.

Among the differences over the Cummings' construction is the fact that the weakening notches of my nail are located in a different position from those of the Cummings patent and effect a different action of the nail, causing its legs to spread gradually from the outer ends thereof, so that the nail eventually obtains a more effective hold on the material into which it is driven. Another object is to so form the nail that it has a head of each of the legs enabling it to be more readily driven into place, the two heads substantially abutting and giving the general appearance of a single head when the longer leg has been driven into place. Another distinction is that my nail is adapted for ready manufacture out of ordinary round wire.

My improved nail is illustrated in the drawing hereof and more fully hereinafter explained in connection with such drawing.

In the drawing, Fig. 1 is a side elevation of my self-clinching nail in its normal or unapplied form; Fig. 2 is a plan of the same on a larger scale; Fig. 3 is a section through a support and a layer to be attached thereto, showing the nail in side elevation driven in to the point where the head on the shorter leg engages the outer surface of the layer being attached; Fig. 4 is a similar view showing the spread condition of the nail in its final position in the support; Fig. 5 is a fragmentary longitudinal section of the nail unapplied, as indicated by the line 5—5 on Fig. 1 and on a larger scale; Fig. 6 is a transverse section through the two legs of the nail, as indicated by the line 6—6 on Fig. 1 on the same scale as Fig. 5; Fig. 7 is a plan of the nail when in final position, illustrating the mutual relation of the two heads on the outer side of the attached layer.

In its normal or unapplied position my fastening device comprises a relatively long substantially cylindrical leg 10 and a relatively short substantially cylindrical leg 11, these legs lying parallel with each other slightly spaced apart and connected by a U-bend 12. The longer leg 10 is formed with a notch 13 on its inner surface, and the shorter leg 11 is formed with a similar notch 14 on its inner surface, located somewhat nearer the return bend 12.

The return bend 12 is caused to converge in its cross section providing a relatively sharpened portion 15 along its outer edge to aid in the entering of the nail into the material. The two legs 10 and 11 are provided at their outer ends with heads 16 and 17 respectively. Each head has a circular contour on the outer side but on the inner side is cut off on a line tangent to the inner face of the corresponding leg, as shown at 19 in Figs. 2 and 7.

In Figs. 3 and 4 there is indicated, at A, a suitable support which may be a slab of plaster-like material or other similar substance now frequently used as a building material. B in these views and in Fig. 7 indicates a sheet to be attached to the support as, for instance, a sheet of roofing material or insulating layer.

In applying my nail, the reduced edge 15 is placed against the layer to be attached and by hammer blows against the head 16 on the longer leg the nail is driven straight into the material until the head 17 of the shorter leg engages the outer face of the layer being attached. Such engagement anchors the end of that leg and as the hammer blows continue the longer leg moves inwardly relative to the shorter leg with a resultant distortion of the inner portion of the nail, the notches 13 and 14 weakening the two shanks of the nail so that the lowermost portion readily bends to one side.

By reason of the notch 13 on the longer leg being farther from the U-bend than the notch 14 on the shorter leg (resulting in the lower portion 21 of the longer leg being longer than the lower portion 20 of the shorter leg) the legs, as they bend at their notches are spread apart, the longer portion 21 shoving the portion 20 laterally. This spreading continues until the portion 21 of the longer leg below the notch lies substantially transversely in the material in a direction approximating parallelism with the layer attached.

As the U-bend portion of the nail is diverted in position on its way from the position shown in Fig. 3 to that shown in Fig. 4, the comparatively sharp outer edge 15 of the U-bend forms an advance guiding edge enabling the bend to plow its way readily through the material of the support until it reaches the position shown in Fig. 4.

The final driving operation, after the shorter leg has become anchored, causes the two legs to flare from the head portions, the upper ends of the legs coming into abutting relation and the flare being substantially continuous from the head to the transverse region 21 made by the larger leg. This provides a considerable space between the two legs as shown at $a$ in Fig. 4 into which the material of the supporting slab displaced by the driving in of the nail passes to some extent as shown at $a$ in Fig. 4. The effect is to cause a very firm anchorage of the nail in the slab.

When the nail is finally in place the straight inner edges of the two heads 16 and 17 substantially abut each other, as shown in Fig. 7, with the result that there is in effect a single elongated head for the fastening device, eliminating leakage between the heads and presenting a unitary appearance on the exterior.

By providing the slight space initially between the legs, as shown in Figs. 1 and 3, the action of the longer leg on the U-bend carrying the parts into the position of Fig. 4 is effected with less force than otherwise, but when the nail is fully inserted the space between the legs is closed at the upper end as shown in Fig. 4. The location of the weakening notches 13 and 14 on the inner sides of the legs leaves the outer sides of the legs perfectly smooth so that the nail is readily driven into the substance to which it is to be anchored.

As shown in Fig. 6, the nails may be readily formed from a coil of wire. The ends of a section of such wire are simply upset, as in ordinary nail machine, to provide the heads and by suitable pressure the notches are formed and the relative sharpening of the region to form the outer surface of the U-bend. Then it is only necessary to bend the straight blank to bring the two legs into parallelism.

I claim:

1. A fastening device made of a single strip of round wire intermediately bent to provide two round legs of different length connected by a U-bend, each of said legs being upset at its end to provide an outwardly extending head normal to the axis of said leg, said heads terminated at their inner edges in parallel lines substantially tangent to the inner face of the leg, said legs lying substantially parallel with each other and spaced slightly apart, there being notches formed in the legs to weaken them in certain regions causing them to bend laterally and spread apart when the longer leg is driven in after the shorter leg has been stopped by engagement of its head, the round wire being deformed along the outer face of the bend to provide a sharpened arcuate extreme edge.

2. A self-clinching fastening device comprising a strip of material bent into U-shape to provide a relatively long leg and a relatively short leg connected by a U-bend, means on the short leg to limit its insertion into material into which the device is driven, a driving head on the free end of the longer leg, there being a single notch in each of the two legs, the lower end of the notch in the longer leg being located farther from the U-bend than the lower end of the notch in the shorter leg, to cause their lateral diversion and the spreading of the legs as the longer leg is driven into place after the shorter leg stops.

3. A self-clinching fastener comprising a strip of material bent into a U-shape to provide a pair of substantially parallel legs connected by a return bend sharpened arcuately along its outer edge, one of said legs being longer than the other, there being a stopping head on the shorter leg and each of the two legs having a single notch on its inner face spaced from the return bend.

4. A fastening device comprising a strip of material bent into a U-shape presenting a pair of legs relatively close to each other and one longer than the other connected at their lower ends by an arcuate return bend, the shorter leg having a stopping head at its outer end, there being notches formed in the legs to cause their diversion when the longer leg is driven in after the shorter leg has been stopped, the U-bend being sharpened along its outer face to present a thin arcuate edge to enable it to plow readily through the material.

GEORGE A. TINNERMAN.

REFERENCES CITED

The following references are of record in the file of this patent:

UNITED STATES PATENTS

| Number | Name | Date |
|---|---|---|
| 909,509 | Akers | Jan. 12, 1909 |
| 1,695,155 | Parker | Dec. 11, 1928 |
| 1,783,248 | Loucks | Dec. 2, 1930 |
| 1,816,387 | Menninger | July 28, 1931 |
| 2,077,120 | Lombard | Apr. 13, 1937 |
| 2,333,930 | Hedstrom | Nov. 9, 1943 |
| 2,355,955 | Cummings | Aug. 15, 1944 |
| 2,376,936 | Pfeffer | May 29, 1945 |